United States Patent
Chang et al.

(10) Patent No.: US 8,082,947 B2
(45) Date of Patent: Dec. 27, 2011

(54) SEPARABLE BALL VALVE APPARATUS AND BALL VALVE ASSEMBLY

(75) Inventors: Seok-Kyu Chang, Daejeon (KR); Chul-Hwa Song, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 155 days.

(21) Appl. No.: 12/632,976

(22) Filed: Dec. 8, 2009

(65) Prior Publication Data

US 2010/0140522 A1 Jun. 10, 2010

(30) Foreign Application Priority Data

Dec. 10, 2008 (KR) .................. 10-2008-0125266

(51) Int. Cl.
*F16L 29/00* (2006.01)

(52) U.S. Cl. .............. 137/614.01; 251/249; 251/250

(58) Field of Classification Search ............. 137/614, 137/614.03–614.06, 798, 614.01; 251/248, 251/250, 249.5, 250.5, 249
See application file for complete search history.

(56) References Cited

U.S. PATENT DOCUMENTS

| 802,948 | A | * | 10/1905 | Waterman | 251/148 |
| 2,482,873 | A | * | 9/1949 | Roberts | 251/249 |
| 4,622,997 | A | * | 11/1986 | Paddington | 137/614.06 |
| 4,749,004 | A | * | 6/1988 | Peash | 251/248 |
| 5,507,313 | A | * | 4/1996 | LeDevehat | 137/614.05 |
| 5,507,469 | A | * | 4/1996 | Soderberg | 251/250.5 |

* cited by examiner

*Primary Examiner* — Kevin Lee
(74) *Attorney, Agent, or Firm* — Baker & Hostetler LLP

(57) ABSTRACT

A separable ball valve apparatus and ball valve assembly capable of selectively opening/closing a separable flow path are provided. The separable ball valve apparatus comprises a separable pipe member having a flow path through which fluid flows, a ball member having at least two balls disposed in the pipe member, opening and closing the flow path, and adjacent to each other, and an opening/closing member configured to control the ball member to open/close the flow path, wherein the balls have through-holes, respectively, and the opening/closing member includes a gear train configured to control the opening/closing of the at least two balls. Therefore, it is possible to simply open/close pipes having the flow path and detachably attach the pipes, increase space utilization due to removal of a separate coupling space for attachment/detachment of the pipes, and simultaneously open/close the two pipes, which are separated from each other through one operation.

12 Claims, 8 Drawing Sheets

SEPARABLE BALL VALVE APPARATUS AND BALL VALVE ASSEMBLY

CROSS-REFERENCE TO RELATED APPLICATIONS

This application claims priority to foreign Patent Application KR 10-2008-0125266, filed on Dec. 10, 2008, the disclosure of which is incorporated herein by reference in its entirety.

FIELD OF THE INVENTION

The present invention relates to a separable ball valve apparatus and a separable ball valve assembly, and more particularly, to a separable ball valve apparatus and a separable ball valve assembly that can be disposed in a pipe constituted by two detachable parts to simply open and close a flow path.

BACKGROUND OF THE INVENTION

In general, fluids are transported through flow paths formed by tubes or pipes. In daily life, tubes and pipes are widely used to transport fluid through in various fields such as water supply and drainage pipes, gas pipes, air conditioner coolant circulation pipes, waste conveyance pipes. In addition, such tubes or pipes are used to transport radioactive liquids from a storage tank to a reservoir for transportation.

When such tubes or pipes are conventionally used, they may often be separated to block flow of fluids. On the other hand, there are cases that the separated tubes or pipes must be connected to each other to flow the fluids.

For example, since the water supply and drainage pipes or gas pipes are buried under the ground, in order to work at a certain position, fluid in the tubes or pipes must be temporarily blocked. When transportation of the fluid through the water supply and drainage pipes or gas pipes must be temporarily blocked, one side of the pipe may be welded. However, it takes much time and manpower to block the pipe, especially, the welding requires very complicate processes.

When an indoor unit and an outdoor unit of an air conditioner must be separated due to moving, etc., an air conditioner coolant circulation pipe must be separated from the indoor unit and the outdoor unit. In this case, in order to prevent leakage of the coolant, the pipe connecting the indoor unit to the outdoor unit is removed, and connection parts of the indoor unit and the outdoor unit are blocked. Here, the pipe removed cannot be reused at different places due to the length or the bent shape thereof, and cannot be easily connected to a new pipe.

In addition, in the case of the pipe for transporting toxic fluids such as radioactive liquids, a block member is installed at a certain position on the pipe connecting between the storage tank and the reservoir for transportation. While the block member can block the toxic fluids such as radioactive liquids, the toxic fluids may remain on an exposed part of the block member after separation of the pipe to be leaked to the exterior.

Therefore, there is a need to conveniently and safely block and separate or connect the pipes or tubes.

SUMMARY OF THE INVENTION

Accordingly, it is an object of the present invention to provide a separable ball valve apparatus and a separable ball valve assembly that are capable of conveniently blocking a flow path and separating or connecting pipes.

It is another object of the present invention to provide a separable ball valve apparatus and a separable ball valve assembly that are capable of removing necessity of a separate coupling space for blocking a flow path and attaching or detaching pipes to improve space utilization.

It is still another object of the present invention to provide a separable ball valve apparatus and a separable ball valve assembly that are capable of preventing exposure of fluid remaining in a pipe after blocking a flow path and separating the pipe, thereby securing safety.

In order to accomplish the above objects, a separable ball valve assembly in accordance with an aspect of the present invention comprises a separable pipe member, a ball member, and an opening/closing member. The pipe member has a flow path through which fluid flows and is separable in one side. The ball member has at least two balls disposed in the pipe member, opening and closing the flow path, and in contact with each other. The opening/closing member is configured to control the ball member to open/close the flow path. The balls have through-holes, respectively, and the opening/closing member includes a gear train configured to control the opening/closing of the at least two balls.

In order to accomplish the above objects, a separable ball valve assembly in accordance with an aspect of the present invention comprises: a separable pipe member having a flow path through which fluid flows; a ball member having at least two balls disposed in the pipe member, opening and closing the flow path, and adjacent to each other; and an opening/closing member configured to control the ball member to open/close the flow path, wherein the balls have through-holes, respectively, and the opening/closing member includes a gear train configured to control the opening/closing of the at least two balls.

The gear train of the opening/closing member may include a central gear, and first and second gears, the first gear connected to one of the balls at its rotation center, the second gear connected to the other ball at its rotation center, and the central gear disposed between the first and second gears, wherein a toothed part is formed at a portion of a circumference of the central gear, and the toothed part of the central gear is sequentially meshed with a toothed part of the first gear and a toothed part of the second gear.

The ball may be disposed at a separated part of the pipe member.

A separable ball valve apparatus in accordance with another aspect of the present invention comprises a first pipe, a second pipe, a first ball, a second ball, and an opening/closing unit. The first pipe has a first flow path through which fluid flows, and the second pipe has a second flow path connected to the first flow path and detachably coupled to the first pipe. The first ball has a first through-hole, and is disposed in the first pipe and configured to open/close the first flow path. The second ball is in contact with the first ball, disposed in the second pipe to open/close the second flow path, and has a second through-hole. The opening/closing unit is configured to control and arrange the first and second balls to communicate the first flow path, the first through-hole, the second through-hole and the second flow path, and includes a gear train configured to sequentially control the opening/closing of the first and second balls through one control operation thereof.

A separable ball valve apparatus in accordance with another aspect of the present invention comprises: a first pipe having a first flow path through which fluid flows; a second pipe having a second flow path connected to the first flow path and detachably coupled to the first pipe; a first ball disposed in the first pipe, configured to open/close the first flow path, and having a first through-hole; a second ball in contact with the first ball, disposed in the second pipe to open/close the second flow path, and having a second through-hole; and an opening/closing unit configured to control and arrange the first and second balls to communicate the first flow path, the first through-hole, the second through-hole and the second flow path, wherein the opening/closing unit includes a gear train configured to sequentially control the opening/closing of the first and second balls through one control operation thereof.

The gear train of the separable ball valve apparatus may include a central gear, and first and second gears. The first gear is connected to the first ball to be perpendicular to the first through-hole at its rotation center, the second gear is connected to the second ball to be perpendicular to the second through-hole at its rotation center, and the central gear is disposed between the first and second gears. A toothed part is formed at a portion of a circumference of the central gear, and the toothed part of the central gear is sequentially meshed with a toothed part of the first gear and a toothed part of the second gear. A toothed part of the first and second gears is formed at a portion or the whole of a circumference of the first and second gears, respectively.

In this manner, the central gear may be rotated to be sequentially meshed with the first and second gears to sequentially rotate the first and second gears so that the first and second gears open/close the flow path. In this case, the motion of the first and second gears is independent. In detail, after one of the first and second gears finish the motion of opening/closing, then the other of the first and second gears start the motion of opening/closing. To secure this, the toothed part of the central gear is configured to independently and sequentially rotate the first and second gears which have proper opening/closing angle (e.g. 90°), respectively, the toothed part of the central gear have a first gear driving part and a second gear driving part which may be continuous or discontinuous.

It is desirable that the diameter of the first and the second gears be equal each other and provided with the toothed part formed on at least ¼ of the circumference of the first and the second gears, and that the toothed part of the central gear is formed at a portion of a circumference of the central gear in order to sequentially rotate the first and second gears by 90°. As a result, if the diameter of the central gear is equal to the diameter of one of the first and the second gears, the toothed part of the central gear is formed at the half of the circumference of the central gear (i.e. 180° of a central angle). In addition, if the diameter of the central gear is twice longer than the diameter of one of the first and the second gears, the toothed part of the central gear is formed at the ¼ of the circumference of the central gear (i.e. 90° of a central angle). And, the motion of the first and the second gears occurs due to the motion of central gear, thus a toothed part of the first and second gears is formed at a portion or the whole of a circumference of the first and second gears, respectively.

The toothed part of the first gear may be formed along the circumference of the first gear to form a central angle of 90°, the toothed part of the second gear may be formed along the circumference of the second gear to form a central angle of 90°. The central gear may be first meshed with only the toothed part of the second gear by 90° and then meshed with only the toothed part of the first gear by 90° while the central gear is rotated by 180° in a state in which the first pipe is in communication with the second pipe.

The gear train may be constituted by any one of a spur gear, a bevel gear, and a rack and pinion gear.

When the gear train is constituted by the rack and pinion gear, the central gear may be a rack gear, and the first and second gears are pinion gears. The toothed part of the central gear adjacent to the first gear may be symmetrical to the toothed part of the central gear adjacent to the second gear with respect to a center of the central gear.

The separable ball valve apparatus may further include a handle connected to the central gear.

The second ball may include a recess formed at a side surface perpendicular to the second through-hole and the rotation center of the second gear, and the recess may be in contact with the first ball.

The opening/closing unit may be detachably coupled to the first and second balls.

The first pipe and the second pipe may be disposed on a straight line, or the first and second pipes may be arranged such that an imaginary extension straight line of the first flow path of the first pipe is inclined with respect to an imaginary extension straight line of the second flow path of the second pipe.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the aspects of the invention.

DETAILED DESCRIPTION

Figure 1:
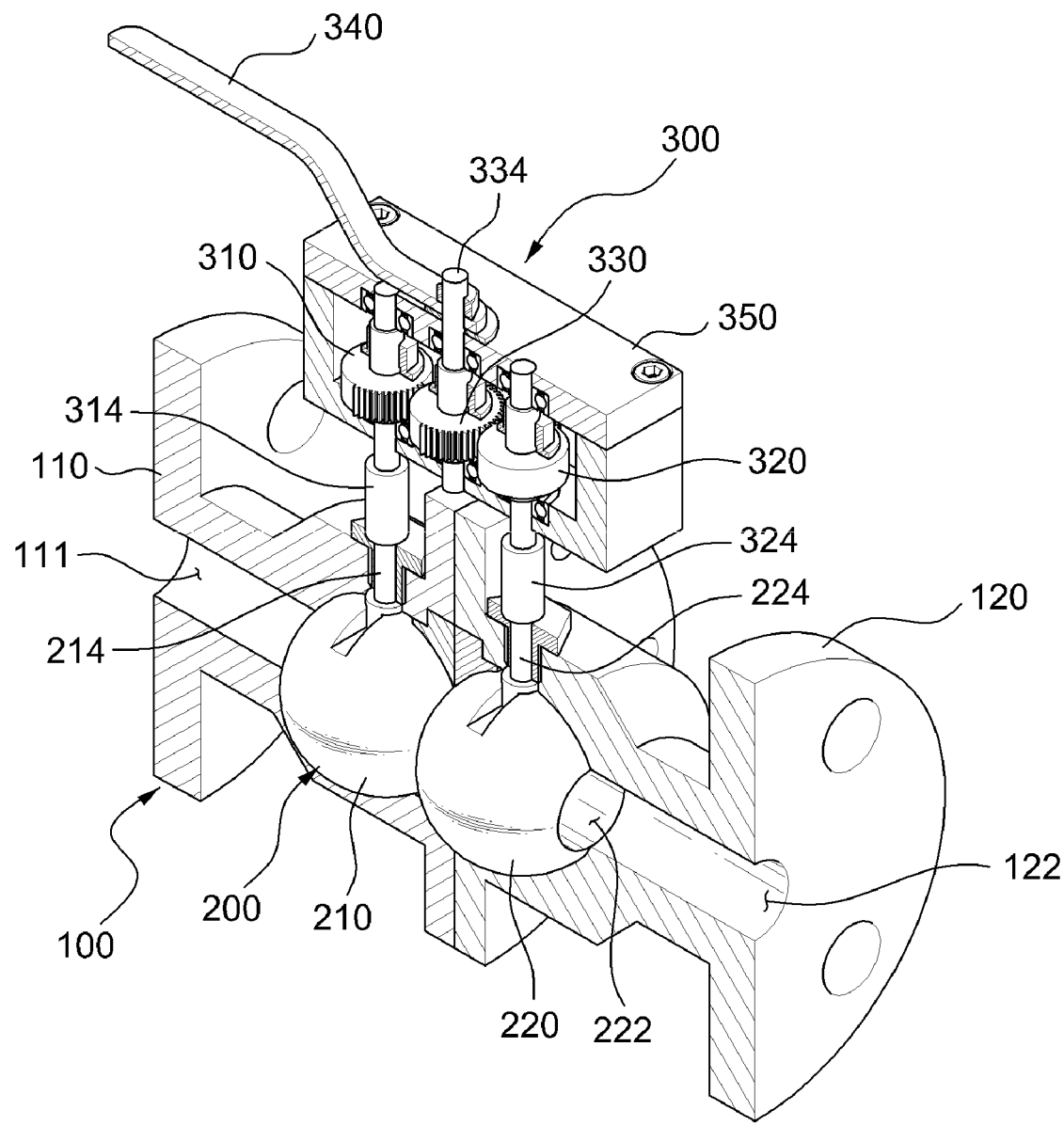
FIG. 1 is a partially cutout perspective view of a separable ball valve apparatus in accordance with an embodiment of the present invention, a flow path being open.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
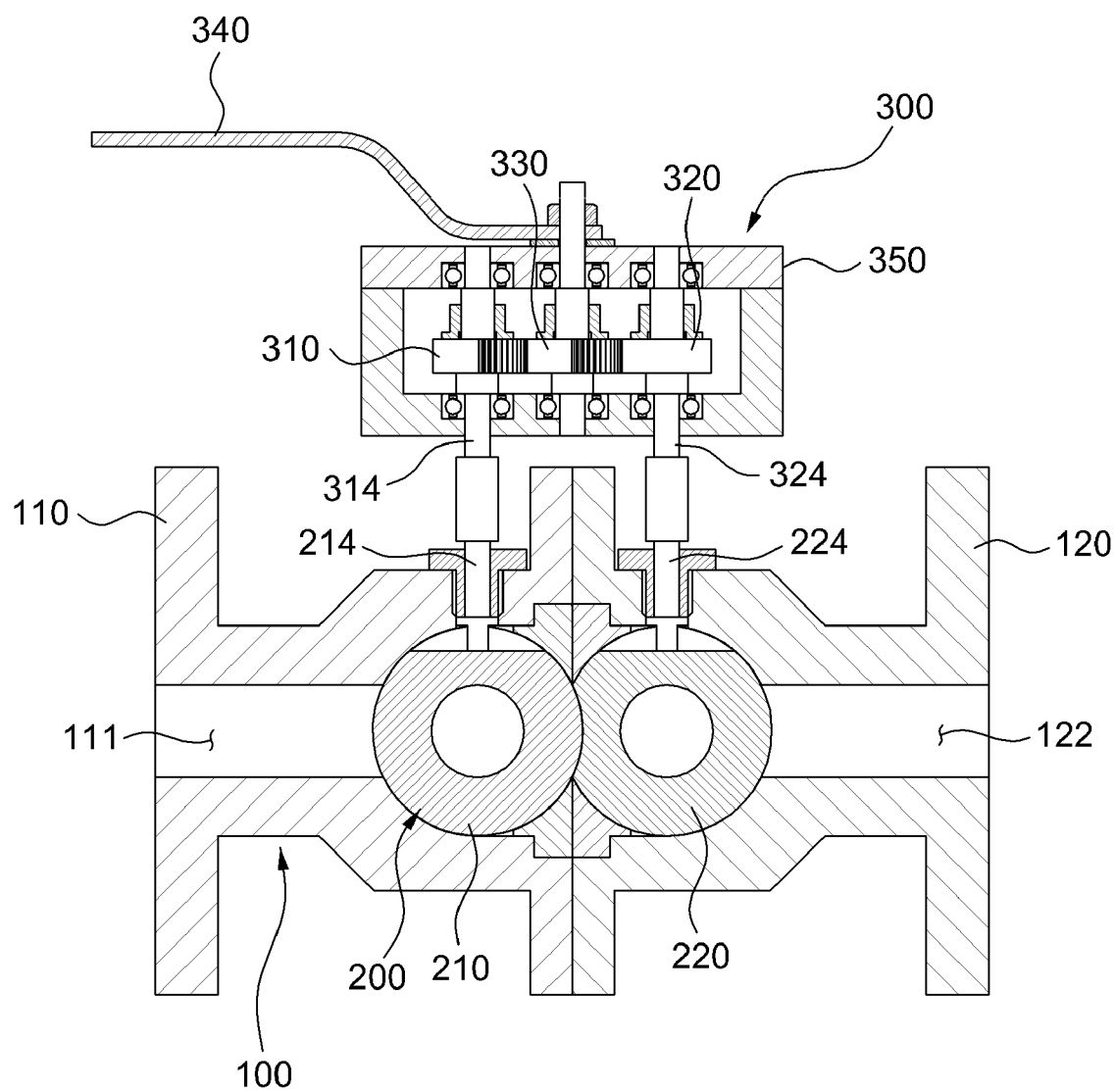
FIG. 2 is a vertical sectional view of the separable ball valve apparatus in accordance with an embodiment of the present invention, the flow path being closed.
Figure 3:
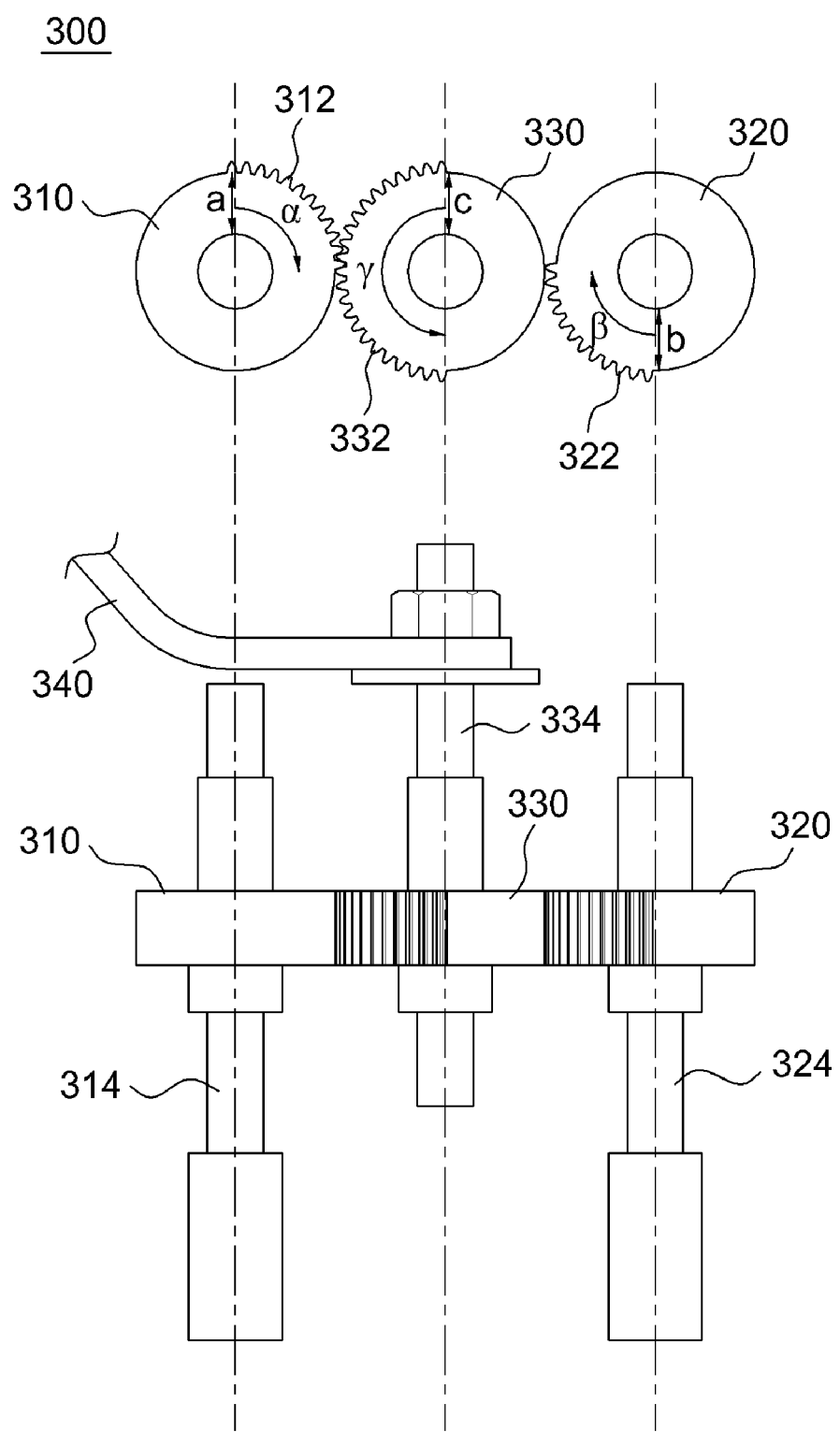
FIG. 3 is a schematic view showing structure of an opening/closing unit in accordance with an embodiment of the present invention.

FIG. 1 is a partially cutout perspective view of a separable ball valve apparatus in accordance with an embodiment of the present invention, a flow path being open, FIG. 2 is a vertical sectional view of the separable ball valve apparatus in accordance with an embodiment of the present invention, the flow path being closed, and FIG. 3 is a schematic view showing a structure of an opening/closing unit in accordance with an embodiment of the present invention.

Referring to FIGS. 1 to 3, a separable ball valve apparatus 10 in accordance with an embodiment of the present invention includes a pipe member 100 constituted by first and second pipes 110 and 120, a ball member 200 constituted by first and second balls 210 and 220, and an opening/closing unit 300 as an opening/closing member.

The first pipe 110 has a cylindrical shape with a first flow path 111 formed therein, through which fluid flows. The first pipe 110 may be formed of a metal or plastic material.

A coupling part is formed at one end of the first pipe 110 to be in contact with the second pipe 120, and a space part is formed adjacent to the coupling part to receive the first ball 210. The space part has a spherical shape corresponding to the shape of the first ball 210, and a size slightly larger than that of the first ball 210. An upper part of the space part may have a hole, through which a first gear coupling bar 214 is inserted to connect the first ball 210 to the opening/closing unit 300.

The second pipe 120 has a shape symmetrical to the first pipe 110 with respect to one end thereof. Specifically, the second pipe 120 has a cylindrical shape with a second flow path 122 formed therein, through which fluid flows. The second pipe 120 may be formed of a metal or plastic material.

A coupling part is formed at one end of the second pipe 120 to be in contact with the first pipe 110, and a space part is formed adjacent to the coupling part to receive the second ball 220. The space part has a spherical shape corresponding to the shape of the second ball 220, and a size slightly larger than that of the second ball 220. An upper part of the space part may have a hole, through which a second gear coupling bar 224 is inserted to connect the second ball 220 to the opening/closing unit 300.

The first and second pipes 110 and 120 may be coupled to or separated from each other through one ends thereof. Since the one ends are coupled to each other in a plane contact manner, leakage of the fluid flowing through the first and second flow paths 111 and 122 is prevented. The first and second pipes 110 and 120 may be connected to each other through threaded engagement, bolt fastening, clamp engagement, etc. On the other hand, the engagement may be released so that the first and second pipes 110 and 120 can be freely separated from each other. In this embodiment, the first and second pipes 110 and 120 are disposed on the same straight line.

The first ball 210 has a spherical shape with a first through-hole 211 passing through its center. The first ball 210 is received in the space part of the first pipe 110, and the first through-hole 211 is parallelly disposed in a longitudinal direction of the first flow path 111 and disposed in the space part.

The first gear coupling bar 214 coupled to a first gear 310 of the opening/closing unit 300 projects from an upper part of the first ball 210 adjacent to the opening/closing unit 300.

The second ball 220 has a shape similar to the first ball 210. Specifically, the second ball 220 has a spherical shape with a second through-hole 222 passing through its center. The second ball 220 is received in the space of the second pipe 120, parallelly disposed in a longitudinal direction of the second flow path 122, and disposed in the space part.

A second gear coupling bar 224 coupled to the second gear 320 of the opening/closing unit 300 projects from an upper part of the second ball 220 adjacent to the opening/closing unit 300.

The second ball 220 has a recess 223 formed in an outer periphery thereof, different from the first ball 210. In a state in which the flow path is closed (in a state in which the first and second through-holes are perpendicular to the first and second flow paths), the recess 223 is formed in the outer periphery of the second ball 220 adjacent to the first ball 210. That is, the recess 223 is formed in one surface of the second ball 220 in a direction perpendicular to a rotation center of the second through-hole 222 and the second gear 320.

The recess 223 has a concave shape corresponding to a convex surface of the first ball 210. That is, the recess 223 has the same radius of curvature as the first ball 210. A portion of the first ball 210 is received in the recess 223 so that the portion of the first ball 210 is in surface contact with the recess 223. As a result, the first and second balls 210 and 220 can stably contact each other with the flow paths being closed, and require no separate space for contact, enabling compact contact.

Figure 4A:
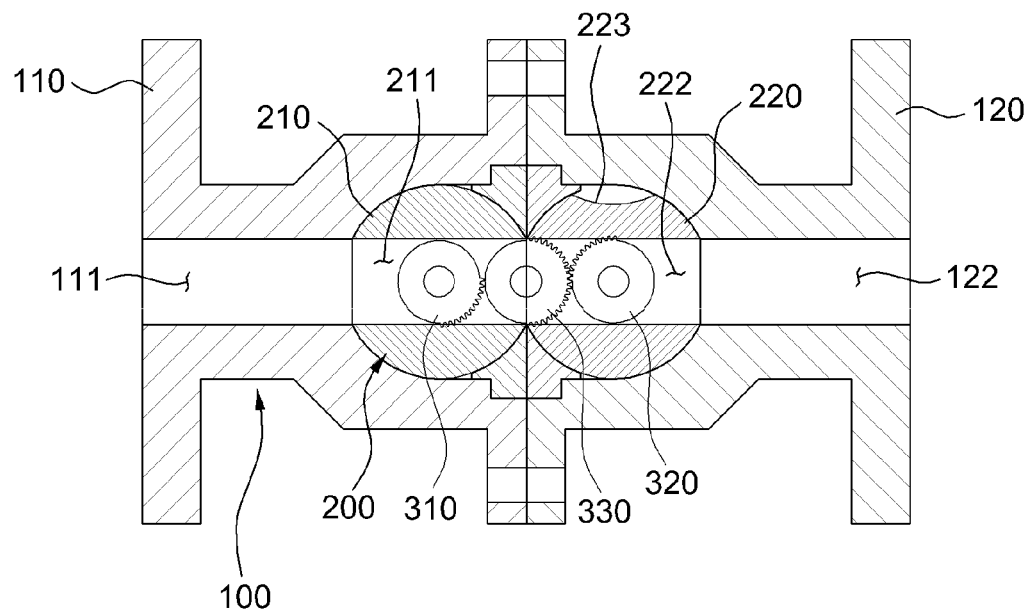
FIGS. 4A to 4D are cross sectional plan views sequentially showing processes of blocking a flow path using the separable ball valve apparatus and separating first and second pipes.
Figure 4B:
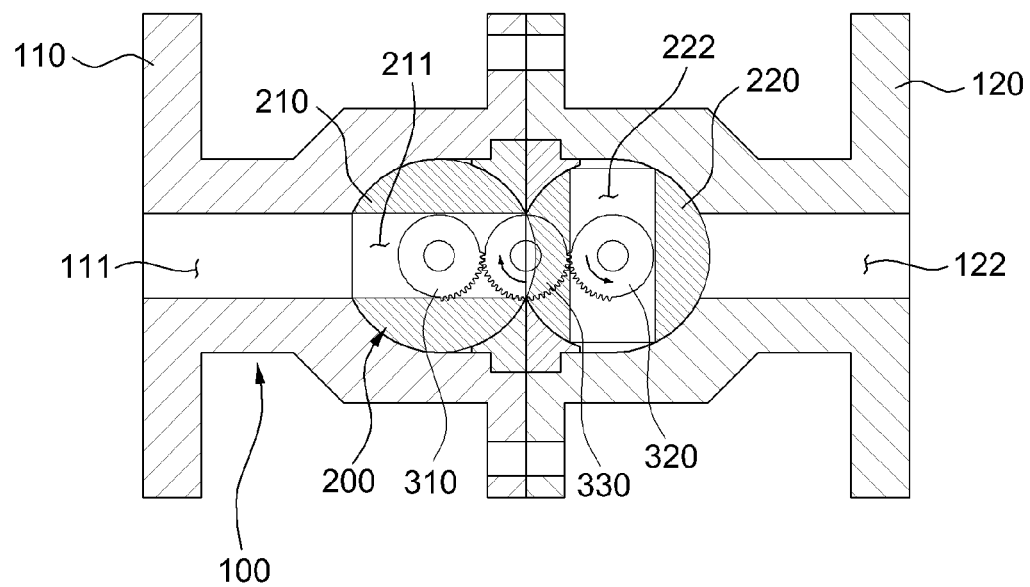

More specifically, the size of the recess 223 is determined by the size of the first and second through-holes 211 and 222. In other words, as shown in FIG. 4A, when the first through-hole 211 is in communication with the second through-hole 222, as shown in FIG. 4B, a gap between the center of the first ball 210 and the center of the second ball 220 is equally maintain even when only the second ball 220 is rotated by 90° counterclockwise, and the second ball 220 is rotated in a state in which the outer periphery of the second ball 220 occupies a portion of the space of the through-hole 211 of the first ball 210. Therefore, the first and second through-holes 211 and 222 have the same diameter as the recess 223.

The opening/closing unit 300 is disposed outside the coupling part between the first and second pipes 110 and 120. The opening/closing unit 300 includes a gear train configured to control opening/closing (rotation) of the first and second balls 210 and 220.

According to a first embodiment of the present invention for the gear train mechanism, the gear train may be constituted by spur gears. Specifically, the gear train includes a first gear 310, a second gear 320, and a central gear 330, which are spur gears.

The central gear 330 is disposed between the first and second gears 310 and 320, and in contact with the first and second gears 310 and 320. The central gear 330 has a toothed part 332 formed at a portion of a circumference thereof. In this embodiment, the central gear 330, the first gear 310, and the second gear 320 have the same diameter. Accordingly, the toothed part of the central gear 330 is formed at the only half of the circumference of the central gear 330 (e.g. 180° of a central angle). If the first gear 310 and the second gear 320 have the same diameter and the diameter of the central gear is twice longer than the diameter of one of the first and the second gears 310 and 320, the toothed part 332 of the central gear is formed at the ¼ of the circumference of the central gear (i.e. 90° of a central angle).

A toothed part of the first and second gears 310 and 320 is formed at a portion or the whole of the a circumference of the first and second gears 310 and 320, respectively. In this case, the first and the second gears are provided with the toothed part formed on at least ¼ (i.e. 90° of a central angle) of the circumference of the first and the second gears 310 and 320 so that the first and the second gears 310 and 320 are rotatable by 90° of a central angle. In this embodiment, the toothed part 312 and 322 of the first and the second gears 310 and 320 are formed at the central angle 90° of the circumference of the first and the second gears 310 and 320, respectively.

A handle connecting bar 334 is connected to a rotation center of the central gear 330. One end of the handle connecting bar 334 is connected to the rotation center of the central gear 330 and extends outward in a radial direction of the pipe member 100. The other end of the handle connecting bar 334 is coupled to a handle 340. The handle 340 is configured to rotate the central gear 330 within an angle range of 180°. In this embodiment, the handle 340 is directly integrally fixed to the handle connecting bar 334. In addition, in order to readily check the open or closed state through the position of the handle 340, a gear train is added between the handle 340 and the handle connecting bar 334 so that the central gear 330 is rotated 180° while the handle is rotated 90°. In this case, the open state is when the handle 340 is parallel to a longitudinal direction of the first and second pipes 110 and 120, and the closed state is when the handle 340 is perpendicular to the longitudinal direction of the first and second pipes 110 and 120. Therefore, as the handle 340 rotates, the central gear 330 is also rotated corresponding thereto. While FIGS. 1 to 3 illustrate the manually operated handle 340, the handle 340 may be automatically operated by the handle connecting bar 334 and the motor, not being limited thereto.

The first and second gears 310 and 320 are meshed with the central gear 330. As shown in FIG. 3, the first gear 310 is disposed at a left side of the central gear 330, and the second gear 320 is disposed at a right side of the central gear 320. The first gear 310, the central gear 330, and the second gear 320 are straightly disposed at their rotation centers.

The first gear 310 is connected to the first ball 210 by a first ball connecting bar 314. The first ball connecting bar 314 is connected to the rotation center of the first gear 310, and may be detachably coupled to the first gear coupling bar 214. Therefore, the first ball 210 is integrally rotated with the first gear 310.

A portion of the toothed part 332 of the central gear 330 may be meshed with the toothed part 312 of the first gear 310. As the central gear 330 rotates, the toothed part 332 of the central gear 330 is meshed with the toothed part 312 of the first gear 310 and the first gear 310 is rotated to 90°, in which the toothed part 312 is formed. As the first gear 310 rotates, the first ball connecting bar 314 connected thereto is rotated to an angle corresponding to the rotation angle of the first gear 310, and the first gear coupling bar 214 connected thereto is also rotated. As a result, the first ball 210 is simultaneously rotated to an angle corresponding to the rotation angle of the first gear 310.

The second gear 320 is connected to the second ball 220 by a second ball connecting bar 324, and the second ball connecting bar 324 may be detachably coupled to the second gear coupling bar 224. Therefore, the second ball 220 is integrally rotated with the second gear 320.

The toothed part 322 of the second gear 320 may be meshed with a portion of the toothed part 332 of the central gear 330. As the central gear 300 rotates, the toothed part 332 of the central gear 330 is meshed with the toothed part 322 of the second gear 320 so that the second gear 320 is rotated to 90°, in which the toothed part 322 is formed. As the second gear 320 rotates, the second ball connecting bar 324 connected thereto is rotated to an angle corresponding to the rotation angle of the second gear 320, and the second gear coupling bar 224 connected thereto is also rotated. As a result, the second ball 220 is simultaneously rotated to an angle corresponding to the rotation angle of the first gear 310.

As described above, some or all of the components of the opening/closing unit 300 may be detachably attached to the ball member 200 received in the pipe member 100. That is, the first ball connecting bar 314 of the opening/closing unit 300 may be detachably coupled to the first gear coupling bar 214, and the second ball connecting bar 324 may be detachably coupled to the second gear coupling bar 224.

The first ball connecting bar 314 may be coupled to the first gear coupling bar 214 in a wrench method. Specifically, a wrench groove having a polygonal shape, for example, a rectangular or hexagonal shape, is formed in a distal end of the first ball connecting bar 314. A distal end of the first gear coupling bar 214 is inserted into the wrench groove, and has a wrench insertion part having a polygonal shape corresponding to the wrench groove. As a result, the opening/closing unit 300 and the ball member 200 may be detachably configured by the above constitution. It is also similar in the second ball connecting bar 324 and the second gear coupling bar 224.

The circumferential length of the toothed part 332 of the central gear 330 is equal to the sum of the circumferential length of the toothed part 312 of the first gear 310 and the circumferential length of the toothed part 322 of the second gear 320.

Specifically, referring to FIG. 3, the circumferential length of the toothed part 332 of the central gear 330 is represented as the product $c\gamma$ of a radius c of the central gear 330 and an angle $\gamma$ of the toothed part 332. Similarly, the circumferential length of the toothed part 312 of the first gear 310 is represented as the product $a\alpha$ of a radius a of the first gear 310 and an angle $\alpha$ of the toothed part 312, and the circumferential length of the toothed part 322 of the second gear 320 is represented as the product $b\beta$ of a radius b of the second gear 320 and an angle $\beta$ of the toothed part 322. As a result, the following relation may be presented.

$$c\gamma = a\alpha + b\beta$$

The first gear 310, the second gear 320 and the central gear 330 are received in a housing 350, and portions of the handle connecting bar 334, the first ball connecting bar 314 and the second ball connecting bar 324 are exposed to the exterior of the housing 350.

The opening/closing unit 300 may be detachably coupled to the ball member 200. As a result, the opening/closing unit 300 may be connected to the ball member 200 to open and close the flow path upon separation or connection of the pipe member 100 only.

As described above, while the embodiment illustrates the toothed parts 312, 322 and 332, which are partially formed at the first gear 310, the second gear 320 and the central gear 330, respectively, the toothed part 312, 322 and 332 may be entirely formed at the gears 310, 320 and 330, not being limited thereto.

Specifically, the toothed part 332 of the central gear 330 may be partially formed, and the toothed part 312 of the first gear 310 and the toothed part 322 of the second gear 320 may be entirely formed along their circumferences. Here, the toothed part 332 of the central gear 330 may have an angle of 45° to 180° along its circumference. A rotation range of the handle 340 may be set depending on the angle of the toothed part 332 of the central gear 330. For example, when the toothed part 332 of the central gear 330 is formed within an angle range of 45° to 90°, the handle 340 may be set to be rotated to 360°. In addition, when the toothed part 332 of the central gear 330 is formed to an angle of 180°, in a state in which a center of the toothed part 332 is in contact with any one of the toothed part 312 of the first gear 310 and the toothed part 322 of the second gear 320, the handle 340 is set to be rotated within an angle range of 180°.

In addition, start points and finish points of the toothed parts 312, 322 and 332 may have teeth having different shapes than the other parts in order to remove rotation errors.

Hereinafter, operation of the separable ball valve apparatus 10 in accordance with the present invention will be described, in which the toothed parts 312, 322 and 332 of the first gear 310, the second gear 320 and the central gear 330 are partially formed. FIGS. 4A to 4D are cross sectional plan views sequentially showing processes of blocking a flow path using the separable ball valve apparatus 10 and separating first and second pipes 110 and 120.

Hereinafter, the operation will be described with reference to angular coordinates as absolute coordinates, in which a right horizontal direction is 0° and an angle increases to 360° counterclockwise.

FIG. 4A shows a state in which the first through-hole 211 is in communication with the second through-hole 222, and the toothed part 332 of the central gear 330 is disposed from 270° to 90° of the absolute coordinates. Here, the toothed part 312 of the first gear 310 is disposed from 270° to 0° of the absolute coordinates, and the toothed part 322 of the first gear 320 is disposed from 90° to 180° of the absolute coordinates.

Next, as shown in FIG. 4B, when the handle 340 is rotated by 90° clockwise, the central gear 330 is also rotated clockwise so that the toothed part 332 of the central gear 330 is disposed from 180° to 0° of the absolute coordinates. As the central gear 330 rotates, the toothed part 332 of the central gear 330 is meshed with the toothed part 322 of the second gear 320 to rotate the second gear 320 by 90° clockwise. Therefore, the toothed part 322 of the second gear 320 is disposed from 180° to 270° of the absolute coordinates. Here, since the toothed part 312 of the first gear 310 is not meshed with the toothed part 332 of the central gear 330, the toothed part 312 of the first gear 310 is not rotated and disposed from 270° to 0° of the absolute coordinates as shown in FIG. 4A. As a result, the second through-hole 222 is disposed perpendicular to the second flow path 122 to close the second flow path 122.

Figure 4C:
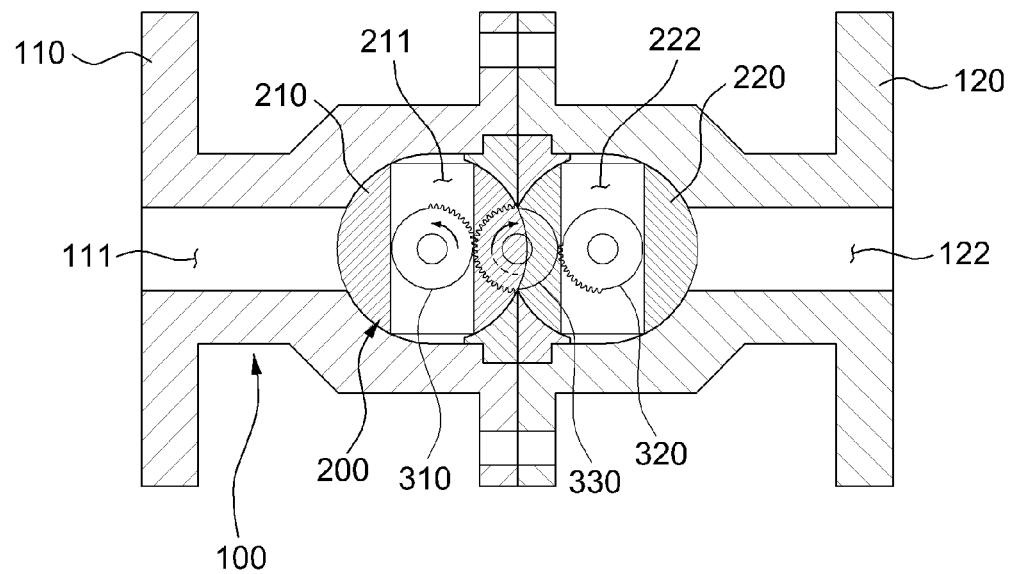

In FIG. 4B, when the handle 340 is rotated by 90° clockwise to further rotate the central gear 330 by 90° clockwise as shown in FIG. 4C, the toothed part 332 is moved to be disposed from 180° to 270° of the absolute coordinates, and the toothed part 332 of the central gear 330 is meshed with the toothed part 312 of the first gear 310 to rotate the first gear 310 by 90° counterclockwise. Therefore, the toothed part 312 of the first gear 310 is disposed from 0° to 90° of the absolute coordinates. Here, since the toothed part 322 of the second gear 320 is not meshed with the toothed part 332 of the central gear 330, the toothed part 322 of the second gear 320 is not rotated and disposed from 180° to 270° of the absolute coordinates as shown in FIG. 4B. As a result, the first through-hole 211 is disposed perpendicular to the first flow path 111 to close the first flow path 111.

In brief, in an open state of the pipe of FIG. 4A, as shown in FIG. 4B, as the central gear 330 is rotated by 90° clockwise, the second through-hole 222 and the second flow path 122 are closed, and as shown in FIG. 4C, as the central gear 330 is additionally rotated by 90° clockwise, the first through-hole 211 and the first flow path 111 are closed. That is, as the central gear 330 is rotated by 180° clockwise, communication between the first and second flow paths 111 and 122 is blocked by sequential 90° counterclockwise rotations of the second ball 220 and the first ball 210.

Figure 4D:
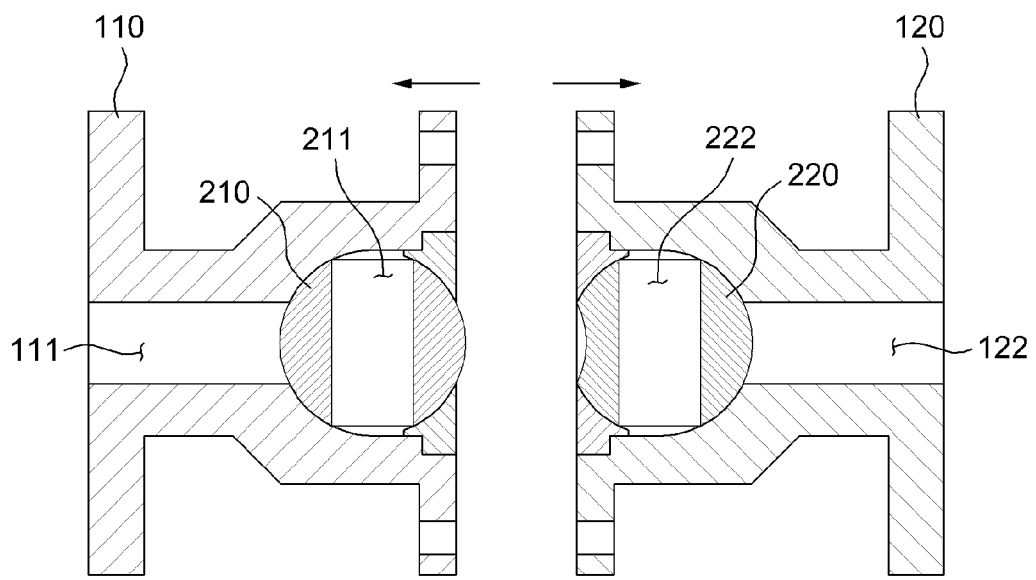

Referring to FIG. 4D, in a state in which the first and second flow paths 111 and 122 are closed, the opening/closing unit 300 is separated from the ball member 200, and the threaded engagement, bolt fastening or clamp engagement is released so that the first and second pipes 110 and 120 can be stably separated from each other. The separated parts of the first and second pipes 110 and 120 are sealed by a sealing member to prevent exposure of the first and second balls 210 and 220 to the exterior.

In order to open the flow path, first, the first and second pipes 110 and 120 are coupled to each other through threaded engagement, etc., and the handle 340 is rotated by 180° counterclockwise, in an opposite direction upon opening of the flow path.

Figure 5A:
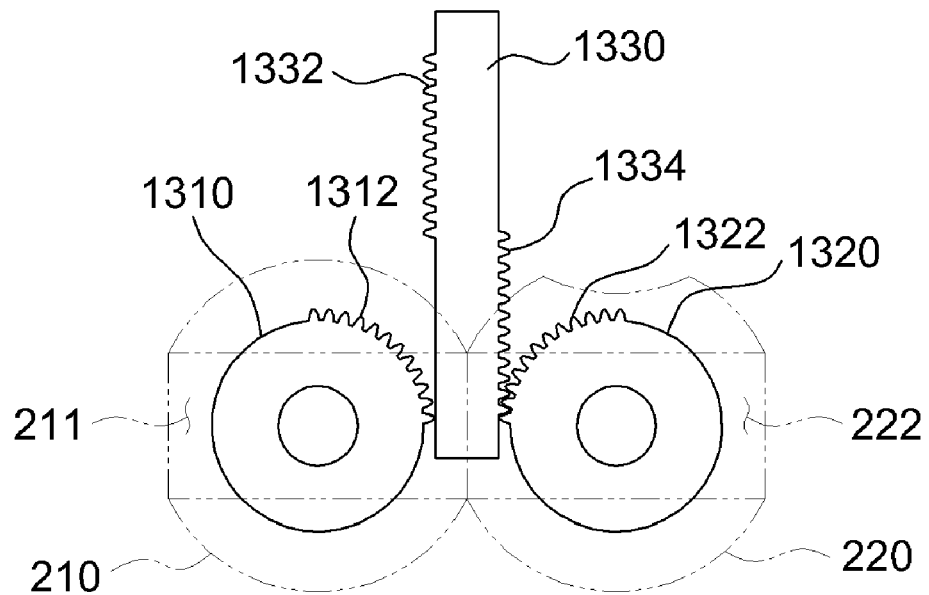
FIGS. 5A to 5C are cross sectional plan views showing a process of closing a flow path using a separable ball valve apparatus in accordance with a second embodiment of the present invention.
Figure 5B:
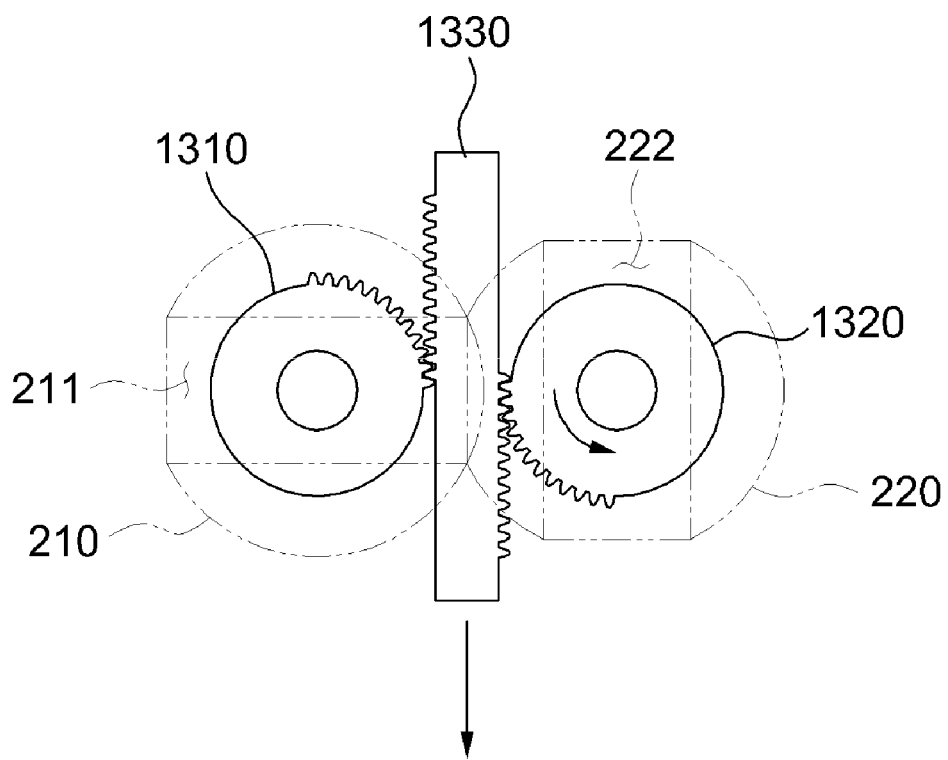
Figure 5C:
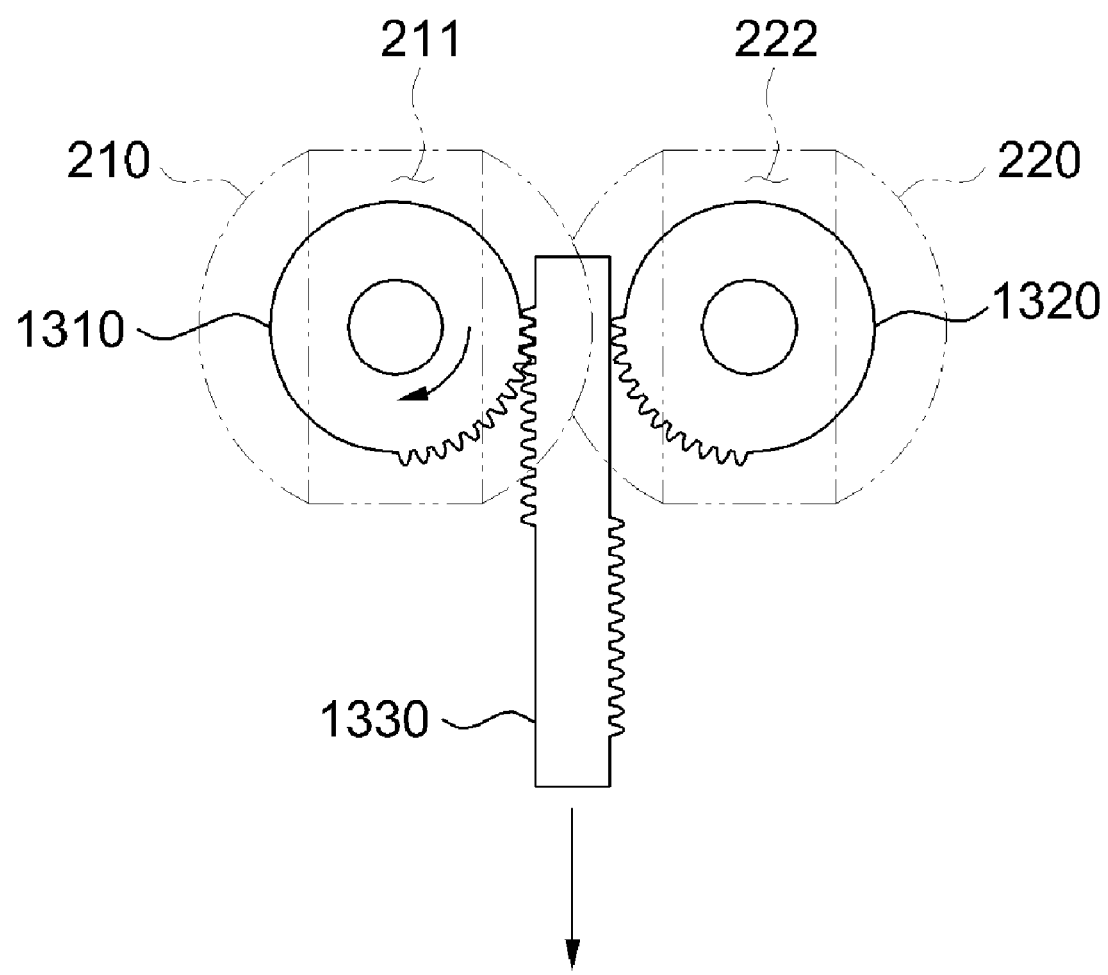

FIGS. 5A to 5C are cross sectional plan views showing a process of closing a flow path using a separable ball valve apparatus 10 in accordance with a second embodiment of the present invention.

According to the second embodiment of the present invention for the gear train mechanism, the gear train may be constituted by a rack and pinion gear. That is, the gear train includes first and second gears 1310 and 1320 as pinion gears, and a central gear 1330 as a rack gear.

Since the rack and pinion gear of the second embodiment is similar to the spur gears of the first embodiment, like reference numerals denote like elements, and description thereof will be omitted for the convenience of description. Hereinafter, different parts from the first embodiment will be described.

A toothed part 1312 of the first gear 1310 and a toothed part 1322 of the second gear 1320 may be partially or entirely formed along circumferences thereof. A toothed part 1332 of the central gear 1330 adjacent to the first gear 1310 is disposed symmetrical to a toothed part 1334 of the central gear 1330 adjacent to the second gear 1320 with respect to a center of the central gear 1330.

Referring to FIG. 5A, when the central gear 1330 passes between the first and second gears 1310 and 1320, the toothed part 1334 is first meshed with the toothed part 1322 of the second gear 1320.

Referring to FIGS. 5B and 5C, the toothed part 1334 of the central gear 1330 is meshed with the toothed part 1322 of the second gear 1320 to rotate the second gear 1320 by 90° counterclockwise to close a second flow path 122. Then, the toothed part 1332 of the central gear 1330 is meshed with the toothed part 1312 of the first gear 1310 to rotate the first gear 1310 by 90° clockwise to close a first flow path 111.

Figure 6:
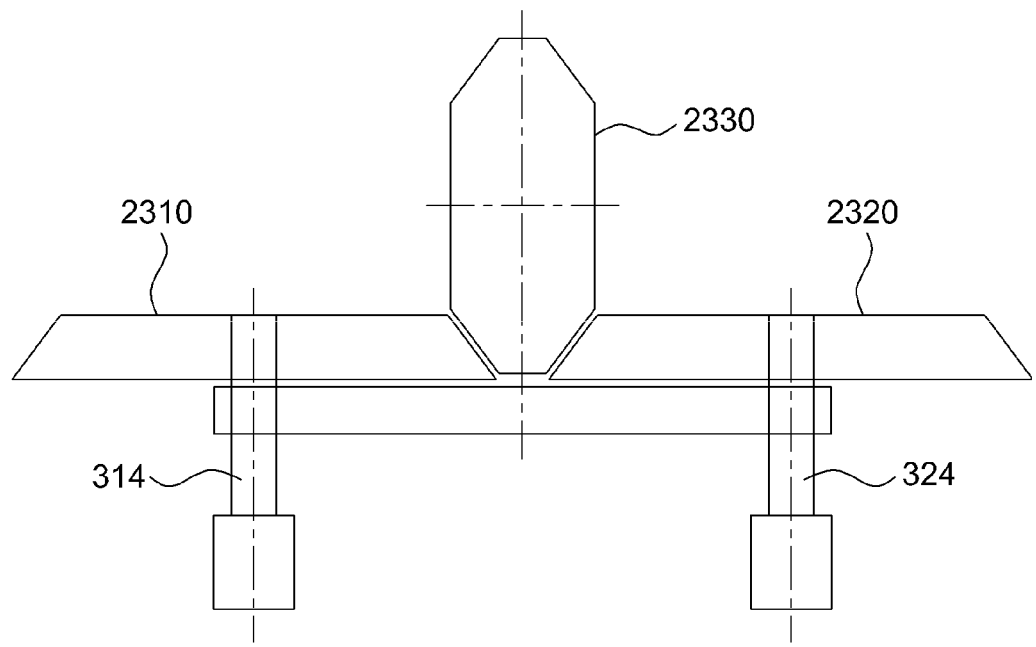
FIG. 6 is a schematic view showing a block unit of a separable ball valve apparatus in accordance with a third embodiment of a gear train of the present invention.

FIG. 6 is a schematic view showing a block unit of a separable ball valve apparatus 10 in accordance with a third embodiment of a gear train of the present invention.

According to the third embodiment of the present invention for the gear train mechanism, the gear train may be constituted by a bevel gear. That is, the gear train includes a first gear 2310, a central gear 2330, and a second gear 2320, which are bevel gears.

Figure 7:
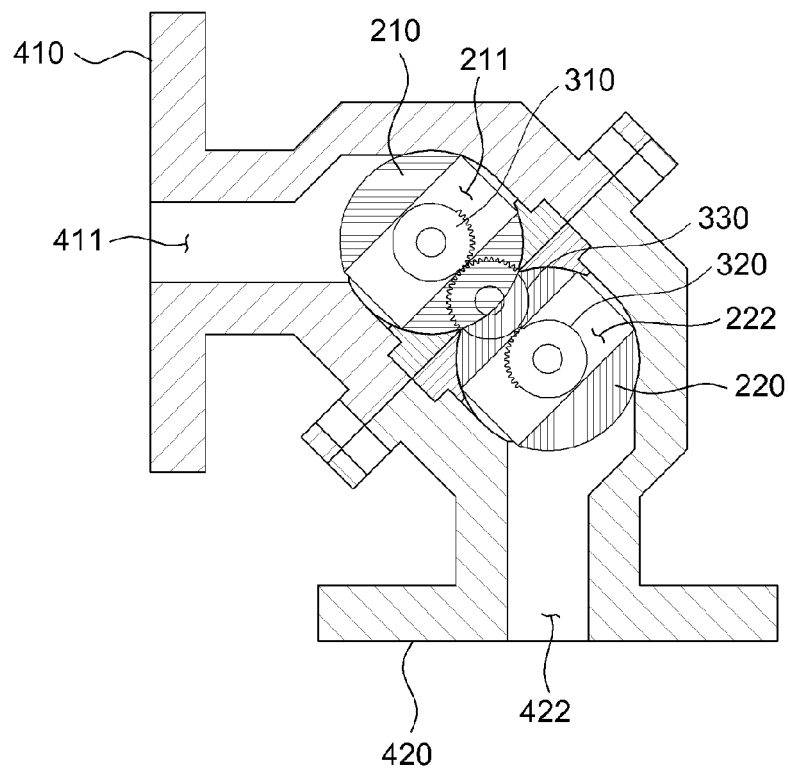
FIG. 7 is a vertical sectional view of a closed state of a separable ball valve apparatus in accordance with a variant embodiment of a pipe member.

FIG. 7 is a vertical sectional view of a closed state of a separable ball valve apparatus in accordance with a variant embodiment of a pipe member.

Since the separable ball valve apparatus in accordance with a variant embodiment of the pipe member is similar to the separable ball valve apparatus 10, like reference numerals denote like elements, and description thereof will be omitted for the convenience of description. Hereinafter, difference between the variant embodiment and the above embodiments will be described.

In the variant embodiment, third and fourth pipes 410 and 420 have a 'L' shape. That is, a third flow path 411 of the third pipe 410 and a fourth flow path 422 of the fourth pipe 420 are bent. While this embodiment illustrates the third and fourth pipes 410 and 420 bent by 90° to form the 'L' shape, the third and fourth pipes may be arbitrarily bent to an angle of 0° to 180°, not being limited thereto.

In the variant embodiment, balls 210 and 220 and gears 310, 330 and 320 are disposed in a connection part between the third and fourth pipes 410 and 420 in a 45° inclined direction to selectively open/close a flow path. The opening/ closing of the flow path is similar to the above embodiment, and thus, description thereof will be omitted.

The separable ball valve apparatus 10 in accordance with the present invention has an advantage of easily opening and closing the flow path through a simple control operation such as one rotation of the handle, enabling separation of the pipe member 100. In addition, since there is no unnecessary space in a contact gap between the first and second pipes 110 and 120 and between the first and second balls 210 and 220, it is possible to increase space utilization for separation or coupling.

Further, since portions of the first and second balls 210 and 220 adjacent to each other are not in contact with fluid flowing through the through-holes 211 and 222 in a closed state, it is possible to prevent exposure of the fluid to the exterior even when the first pipe 110 is separated from the second pipe 120, securing safety thereof.

As can be seen from the foregoing, according to the present invention, a separable ball valve apparatus and a ball valve assembly can conveniently block a flow path in a pipe using a ball valve.

In addition, according to the separable ball valve apparatus and a ball valve assembly, it is possible to block a flow path of pipes and then separate the pipes, and readily reconnect the separate pipes and recover the flow path.

Further, according to the separable ball valve apparatus and a ball valve assembly, there is no necessity of a separate coupling space for blocking a flow path and attaching or detaching pipes to improve space utilization.

Furthermore, according to the separable ball valve apparatus and a ball valve assembly, it is possible to prevent exposure of toxic fluid remaining in a pipe after blocking the flow path and separating the pipes, thereby securing safety.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A separable ball valve assembly, comprising:
a separable pipe member having a flow path through which fluid flows;
a ball member having at least two balls disposed in the pipe member, opening and closing the flow path, and adjacent to each other; and
an opening/closing member, configured to control the ball member to open/close the flow path, including a gear train configured to control the opening/closing of the at least two balls, the gear train including:
a first gear connected to one of the balls at its rotation center,
a second gear connected to the other ball at its rotation center, and
a central gear disposed between the first and second gears,
wherein the balls have through-holes, respectively,
wherein a toothed part is formed at a portion of a circumference of the central gear, and the toothed part of the central gear is sequentially meshed with a toothed part of the first gear and a toothed part of the second gear,
wherein the diameter of the first and the second gears are equal to each other and provided with the toothed part formed on at least ¼ of the circumference of the first and the second gears, and the toothed part of the central gear is formed at a portion of the circumference of the central gear in order to sequentially rotate the first and second gears by 90°, and
wherein the second ball comprises a recess formed at a side surface perpendicular to the second through-hole and the rotation center of the second gear, and the recess is in contact with the first ball.

2. The separable ball valve assembly according to claim 1, wherein the balls are disposed at one end of the pipe member.

3. The separable ball valve assembly according to claim 1, wherein the toothed part of the first gear is formed along the circumference of the first gear to form a central angle of 90°, the toothed part of the second gear is formed along the circumference of the second gear to form a central angle of 90°, and the central gear is first meshed with only the toothed part of the second gear by 90° and then meshed with only the toothed part of the first gear by 90° while the central gear is rotated by 180° in a state in which the first pipe is in communication with the second pipe.

4. A separable ball valve apparatus, comprising:
a first pipe having a first flow path through which fluid flows;
a second pipe having a second flow path connected to the first flow path and detachably coupled to the first pipe;
a first ball disposed in the first pipe, configured to open/close the first flow path, and having a first through-hole;
a second ball in contact with the first ball, disposed in the second pipe to open/close the second flow path, and having a second through-hole; and
an opening/closing unit, configured to control and arrange the first and second balls to communicate the first flow path, the first through-hole, the second through-hole and the second flow path, the opening/closing unit including a gear train configured to sequentially control the opening/closing of the first and second balls through one control operation thereof, the gear train including:
a first gear connected to the first ball to be perpendicular to the first through-hole at its rotation center,
a second gear connected to the second ball to be perpendicular to the second through-hole at its rotation center, and
a central gear disposed between the first and second gears,
wherein a toothed part is formed at a portion of a circumference of the central gear, and the toothed part of the central gear is sequentially meshed with a toothed part of the first gear and a toothed part of the second gear,
wherein the diameter of the first and the second gears are equal each other and provided with the toothed part formed on at least ¼ of the circumference of the first and the second gears, and the toothed part of the central gear is formed at a portion of the a circumference of the central gear in order to sequentially rotate the first and second gears by 90°, and
wherein the second ball comprises a recess formed at a side surface perpendicular to the second through-hole and the rotation center of the second gear, and the recess is in contact with the first ball.

5. The separable ball valve apparatus according to claim 4, wherein the toothed part of the first gear is formed along the circumference of the first gear to form a central angle of 90°, the toothed part of the second gear is formed along the circumference of the second gear to form a central angle of 90°, and the central gear is first meshed with only the toothed part of the second gear by 90° and then meshed with only the toothed part of the first gear by 90° while the central gear is rotated by 180° in a state in which the first pipe is in communication with the second pipe.

6. The separable ball valve apparatus according to claim 4, wherein the gear train is constituted by a spur gear.

7. The separable ball valve apparatus according to claim 4, wherein the gear train is constituted by a bevel gear.

8. The separable ball valve apparatus according to claim 4, wherein the gear train is constituted by a rack gear as the central gear, and pinion gears as the first and second gears.

9. The separable ball valve apparatus according to claim 4, further comprising a handle connected to the central gear.

10. The separable ball valve apparatus according to claim 4, wherein the opening/closing unit is detachably coupled to the first and second balls.

11. The separable ball valve apparatus according to claim 4, wherein the first pipe and the second pipe are disposed on a straight line.

12. The separable ball valve apparatus according to claim 4, wherein the first and second pipes are arranged such that an imaginary extension straight line of the first flow path of the first pipe is inclined with respect to an imaginary extension straight line of the second flow path of the second pipe.

* * * * *